March 7, 1967    G. LE ROY    3,307,400
SIGHT GLASS FOR REACTION VESSELS
Filed Aug. 27, 1964
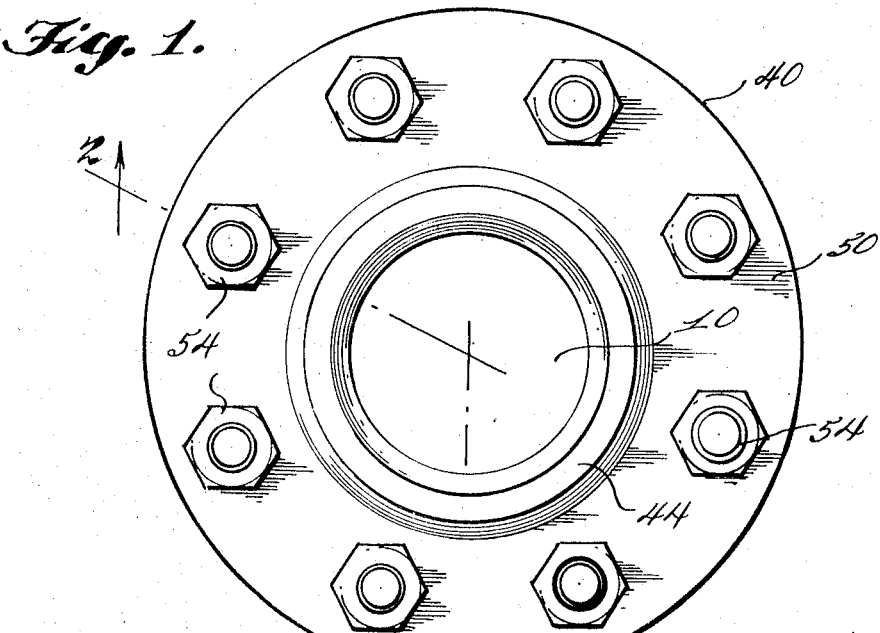
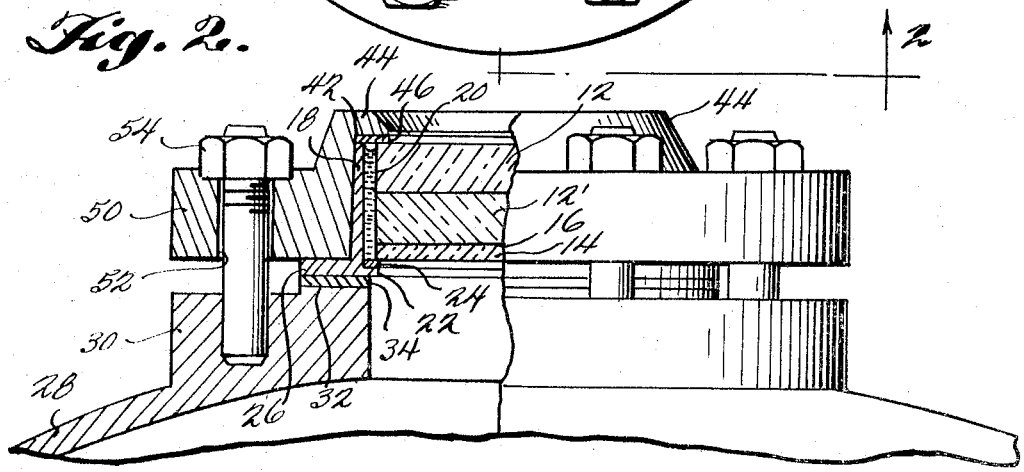
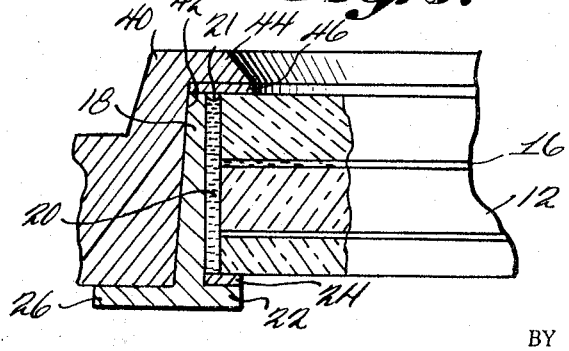
INVENTOR.
Gene LeRoy
BY
Cushman, Darby & Cushman
ATTORNEYS

United States Patent Office 3,307,400
Patented Mar. 7, 1967

3,307,400
SIGHT GLASS FOR REACTION VESSELS
Gene Le Roy, 309 Mount View Drive,
Charleston, W. Va. 25314
Filed Aug. 27, 1964, Ser. No. 392,387
17 Claims. (Cl. 73—331)

This is a continuation-in-part of my earlier application Serial No. 113,915, filed May 31, 1961, now U.S. Patent 3,148,543.

This invention relates to a sight glass for use with reaction vessels. More particularly, this invention relates to a sight glass adapted to resist attack of the contents of the vessel on the glass and to withstand substantial variations in temperature and pressure.

Sight glasses commonly is use with reaction vessels consist, as a rule, of a single piece of glass of suitable composition to meet the stresses due to corrosion and to changes of temperature and pressure. These glasses are conventionally mounted in the wall of said vessel in a suitable holder. However, the glasses are vulnerable to breakage due to improper packing of the glass in the holder and to uneven tension on the holder when mounted on the vessel. Moreover, if breakage does occur, the glass oftentimes cannot support the pressure in the vessel and may shatter before it can be replaced.

It has also been known to form sight glass lenses of several layers of glass, either independent of one another or bonded to form a laminate. The lenses are mounted in a suitable holder and supported therein by a solid resilient packing material usually in the form of cushion rings at the inner and outer ends of the lens assembly. However, these lenses due to their thickness, are very rigid and even more vulnerable to breakage due to improperly adjusted packing or uneven tension on the holder. For example, if too much pressure is exerted on the packing material, the inner ring thereof may exert extreme compressive stresses on the innermost layer of gass and crush the same. Additionally, the packing may tend to leak due to expansion and contraction of the glass corresponding to changes in temperature within the vessel. Also, when these multiple layer lenses need replacement, it is a complicated and tedious procedure, and the vessel is out of operation for extended periods of time. In all known sight glasses, there is great difficulty in maintaining a tightly sealed joint between the lens and the support.

In the aforementioned Patent 3,148,543, there is disclosed a sight glass which has two major components, a lens holding sleeve and a mounting support. The lens holding sleeve is adapted to receive the lens and is further provided with an integral flange to seat against an opening in a reaction vessel. The lens is bonded in the lens holding sleeve with a high temperature, high shear strength cohesive and the sleeve is received in the mounting support which is provided with means to secure the flange of the lens holding sleeve in fixed engagement with the vessel. In a preferred construction the lens is completely surrounded at points of stress by resilient gaskets and the lens is not subject to stresses except those from within the vessel. Although this sight glass is efficient and solves many problems of the prior art, use at extreme high temperatures tends to cause interfacial stresses between the lens and the lens holding sleeve due to the difference in co-efficients of expansion thereof.

It is therefore an object of this invention to provide a sight glass for reaction vessels which overcomes the disadvantages of the prior art.

It is another object of this invention to provide a sight glass in which the dangers of breakage due to improper packing and uneven stresses are eliminated.

It is a further object of this invention to provide a sight glass wherein replacement of damaged lenses is efficiently and quickly performed.

It is a still further object of this invention to provide a sight glass lens sub-assembly wherein interfacial stresses therein are greatly reduced or entirely eliminated.

In accordance with the present invention, a sight glass is provided which is similar in construction to that disclosed in Patent 3,148,543; namely, it comprises a lens, a lens holding sleeve and a mounting support. However, the lens is held in place in the lens holding sleeve by means of a packing material which has a coefficient of expansion compatible with that of the sleeve and the lens.

The invention will be well understood by reference to the following description of an illustrative embodiment thereof shown by way of example in the accompanying drawing wherein:

FIGURE 1 is a top plan view of a sight glass;
FIGURE 2 is a side view of the sight glass partly in section taken along line 2—2 of FIGURE 1; and
FIGURE 3 is an enlarged sectional view of a portion of the sight glass showing the seal between the lens and lens holding sleeve.

Referring now to FIGURES 1 and 2 of the drawing, the sight glass there shown comprises a laminated lens 10, consisting of two discs 12 and 12' of tempered glass shielded with a thinner disc 14 of chemically resistant glass. The discs are all precision ground and bonded together at 16 by a heat, chemical and light resistant non-rigid laminate. The laminated lens is held in lens holding sleeve 18 by packing 20, of a specially compounded filled elastomer described in detail hereinafter. The lens holding sleeve is provided with an inwardly projecting lip 22 at one end thereof. Mounted on said lip is a resilient gasket 24. The lens, in the preferred embodiment, rests on the resilient gasket and substantially fills lens holding sleeve 18 but does not project therebeyond. When the sight glass is assembled, the gasket 24 is in an interposed position between the lens and lip 22 and seals the space therebetween. Lens holding sleeve 18 is further provided with an integral outwardly projecting flange 26 opposite inwardly projecting lip 22, and the outer surface of the sleeve is slightly tapered from said flange. The flange is adapted to engage wall 28 of the reaction vessel. In the embodiment shown, wall 28 has a flanged pad 30 which provides a seat 32 for gasket 34 interposed between the seat and flange 26.

In order to secure the lens holding sleeve in fixed engagement with the wall of the vessel, there is provided a mounting support 40, preferably of forged steel. The support is provided with a substantially centrally disposed bore 42 having inner and outer ends and adapted to receive lens holding sleeve 18 from the inner end thereof. The bore is preferably slightly tapered from the inner end thereof and is terminated at its outer end by an inwardly projecting annular flange 44. A second resilient gasket 46 is mounted on flange 44 within bore 42.

Mounting support 40 is adapted at the portion adjacent the inner end of bore 42 to seat against flange 26 of lens holding sleeve 18. The length of bore 42 is such that when the sight glass is assembled, sufficient pressure is exerted against gasket 46 and lens holding sleeve 18 to form an effective seal. Generally, a compression of between 5 and about 25 percent on gasket 46 is suitable, varying according to the resilience of the material used. Since the lens does not project beyond the end of the sleeve in the preferred embodiment, no excess stress is exerted on said lens. Mounting support 40 is further provided with base flange 50 having a plurality of bores 52 therein. Mounting bolts 54 are adapted to extend through bores 52 and to be received in flanged pad 30 of wall 28 of the vessel. In this manner, flange 26 of lens holding sleeve 18 is secured in fixed engagement with gasket 34 and seat 32 of the flanged pad with no pressure against the lens.

While a preferred embodiment of the present invention has been described above, it is to be understood that many modifications may be made without departing from the spirit and scope thereof. For example, while two discs 12 of tempered glass are shown in the drawings, it is apparent that more may be used if desired. Also, for certain purposes, the interior surface of disc 14 may be coated with a suitable material, e.g., a clear fluorocarbon. Lip 22 may be formed integral with sleeve 18 or may be attached thereto by suitable means. While the outer surface of sleeve 18 is shown as being tapered, it may, of course, be formed without the taper. For use in applications wherein large sources of radiation must be shielded, e.g., ultra-violet, infra red, alpha beta or X-rays, the lens may be formed of radiation resistant glass. For example, there may be used glass which will transmit or prevent transmission of a particular wave length of the electromagnetic spectrum.

The drawings show the various parts of the sight glass in the assembled position. In FIGURE 3, an enlarged view of a portion of the assembled sight glass is presented. In this view, disc 14 of chemically resistant glass is shown in position in lens holding sleeve 18 and abutting against resilient gasket 24. The gasket is preferably formed of a chemically resistant material such as synthetic rubber, silicone rubber or neoprene and is bonded to lip 22 and to the portion of disc 14 which it overlies with a chemically resistant adhesive which is effective both at high and low temperatures, e.g., an epoxy adhesive. One particularly suitable material is bondable Teflon. Teflon is synthetic resin based on tetrafluoroethylene available from E. I. du Pont de Nemours & Co. Normally, unaffected by most adhesives, the resin may be made bondable by treatment with an etching acid such as hydrofluoric acid.

FIGURE 3 also shows in more detail the fluid packing 20 between lens 10 and lens holding sleeve 18. Packing 20 is a resilient chemical and temperature resistant bonding material and comprises a filled or unfilled thermosetting resin having a coefficient of expansion, tensile strength and elongation compatible with the differential in thermal coefficient of expansion between the metal of lens holding sleeve 18 and the glass in lens 10. Therefore, changes in temperature do not adversely affect the seal. The thermosetting resins include silicone and urethane elastomers and polyamide epoxy resins or alloys of two or more of these resins. The filler, together with other functions, modifies the expansion characteristics of the resin so that it is more easily controlled, and may be used in amounts from about 0.5% to about 100% by weight of the elastomer, and preferably from about 30% to about 100%, depending on the filler used and the viscosity of resin. It is to be understood that the above limitations are somewhat necessitated by the physical size limitations of the sight glasses. However, for other purposes, greater amounts of filler could be used. Suitable fillers include powdered aluminum or other metals, silicones or other hard resins in finely divided form, metal oxides, diatomaceous earth, talc, silicas, clays, vermiculite, pulverized Pyrex glass, carbon and mixtures thereof having a particle size between about 0.1 micron and that which will pass a 30 mesh screen and sized to suit the application. Other fillers known in the art may be used. For example, a fiber glass mat or filaments may be formed or wound to substantially fit the space between the lens and the lens holding sleeve, the resin filling the voids in the mat or windings.

Within the smaller size ranges of filler resin are included colloidal inert materials designed to suspend the larger sized filler material during curing cycles of the resin and to function as a thixotropic agent. A preferred filler is "Zerifac" which is an inert mineral filler of essentially zero coefficient of thermal expansion. The filler is used in quantities sufficient to control the thermal expansion of the resin within limits compatible with the differential expansion of the glass and the lens holding sleeve.

The tempered glass discs 12 and the chemically resistant glass disc 14 are first assembled and bonded to form the laminated lens. Resilient gasket 24 is placed in position within lens holding sleeve 18 and is supported by the inwardly projecting annular lip 22. The laminated lens is inserted into the lens holding sleeve with the chemically resistant disc 14 supported by the resilient gasket and bonded into place by the filled elastomer. The resin described above is inserted into the space between sleeve 18 and lens 10 in an amount to leave a slight head space 21. There is produced a unitary lens subassembly of substantial strength. The sleeve, preferably tapered, is thereafter inserted into the matching tapered bore of lens mounting support 40 with the second resilient gasket 46 already in place to form a completed sight glass. When mounted on the reaction vessel, flange 26 of the lens holding sleeve is in fixed engagement with seat 32 of the reaction vessel and held in place by mounting support 40 by means of bolts 54 received in flanged pad 30 of the reaction vessel wall. Also, the chemically resistant disc of the laminated lens is in association with the opening in the reaction vessel and thereby shields the tempered glass disc from corrosion.

Ideally, the laminated lens should completely fill the lens holding sleeve but should not project beyond the end thereof. If the lens were thicker and did project, the glass would be put under compression before a tight seal could be made at the end of the sleeve with the second resilient gasket against the flange of the mounting support. Each disc of tempered glass is designed for the normal rated working pressure of the lens mounting support. For purposes of description this working pressure is designated as having a value 10 and each of the tempered discs therefore has a safety factor of 10. This factor of safety may also be defined as the ratio, allowed for in design, between the breaking load on a member or structure and the safe permissible load thereon. With the use of two tempered discs, one supporting the other, one of the principal safety features of the sight glass of this invention is provided. That is, if breakage of one tempered disc should occur, the other will support the vessel pressure until the unit can be replaced. Also by providing two tempered discs during operation of the vessel, the original safety factor of 10 is doubled.

With the laminated lens and lens holding sleeve supported in the mounting support and entirely surrounded by resilient material, all unnecessary strain on the lens, due, for example, to improperly adjusted prior art solid packing or unequal tightening of the bolts, is eliminated. Since no solid lens packing material is necessary in the sight glass of this invention, all danger of leakage and the difficulties of repacking are obviated. The ease with which a broken or otherwise unsuitable lens may be replaced is apparent. The mounting support is dismounted from the vessel, the sleeve removed, and a new lens holding sleeve with lens in place is substituted. The sight glass is then ready for immediate remounting on the vessel.

The materials used in production of individual component parts of the sight glass do not form a part of this invention, and it is to be understood that any materials having the desired characteristics may be used. For example, the mounting support is preferably formed of forged steel because of its strength. The lens holding sleeve is preferably formed of stainless steel but can be made of any suitable metallic or non-metallic material, e.g., a filled fluorocarbon. It is noted that since it is a portion of the lens holding sleeve which engages the reaction vessel, it is not necessary that any part of the mounting support be modified to perform this function. It is also not necessary that the mounting support be formed of stainless steel or a similar alloy.

Regarding other materials utilized in production of the sight glass, any heat and light resistant non-rigid bond such as silicone may be used to form the laminated lens. Resilient gasket 46 is preferably formed of Teflon, although other materials including asbestos and rubber or combinations thereof may be substituted.

As a specific example of the present invention, a filled elastomer was prepared having 100 parts of epoxy resin as the elastomer, 60 parts of "Zerifac" having a particle size to pass a 200 mesh screen, 4 parts of colloidal silica and 2 parts of $TiO_2$. The elastomer was used in production of a sight glass according to the present invention. The glass was superior in performance under widely varying conditions of temperature and pressure.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. A sight glass for cooperation with an opening in a reaction vessel, said sight glass comprising a lens holding sleeve having an outwardly projecting continuous flange at one end thereof adapted to engage the wall of the vessel surrounding said opening, said sleeve also having at said one end an inwardly projecting lip, a lens received within said sleeve and substantially filling the same, the thermal coefficient of expansion of said lens being different from the thermal coefficient of expansion of said lens-holding sleeve, said lens being held in place with a fluid packing having a coefficient of expansion compatible with the differential in thermal coefficient of expansion between said lens and said sleeve, so that changes in temperature do not adversely affect the seal between said packing and said lens in said sleeve, a resilient gasket interposed between and sealing the space between the lens and the lip, and a mounting support receiving the lens holding sleeve and seated on the flange thereof to limit the pressure applied by the support to the gasket and the lens, said support also being adapted to secure the flange of the lens holding sleeve in fixed engagement with the wall of said vessel and in alignment with said opening.

2. The sight glass according to claim 1 wherein the lens comprises at least two discs of tempered glass shielded by a disc of chemically resistant glass, and a layer of non-rigid bond interposed between and extending throughout the entire area of each of the opposed faces of said discs to form a laminate, said lens being received in the lens holding sleeve with the chemically resistant disc adjacent the resilient gasket.

3. The sight glass according to claim 1 wherein said fluid packing provides an adhesive bond between said lens and said sleeve.

4. The sight glass according to claim 1 wherein said fluid packing is a filled thermosetting resin.

5. The sight glass according to claim 4 wherein said filled thermosetting resin contains from 0.5 to 200 percent by weight of filler having a particle size from 0.1 micron to that which will pass a 30 mesh screen.

6. The sight glass according to claim 1 wherein said mounting support has a substantially centrally disposed bore therein having inner and outer ends, said bore being adapted to receive the lens holding sleeve from the inner end thereof, said support also having an inwardly projecting flange defining the outer end of said bore, and a second resilient gasket within said bore and sealing the space between the lens holding sleeve and the inwardly projecting flange.

7. The sight glass according to claim 6 wherein said fluid packing provides an adhesive bond between said lens and said sleeve and cooperates with said first resilient gasket and said second resilient gasket to seal the space between the interior and exterior of the vessel.

8. The sight glass according to claim 6 wherein the lens comprises at least two discs of tempered glass shielded by a disc of chemically resistant glass, and a layer of non-rigid bond interposed between and extending throughout the entire area of each of the opposed faces of said discs to form a laminate, said lens being received in the lens holding sleeve with the chemically resistant disc adjacent the resilient gasket.

9. The sight glass according to claim 6 wherein said fluid packing is a filled thermosetting resin.

10. The sight glass according to claim 9 wherein said filled thermosetting resin contains from 0.5 to 200 percent by weight of a filler having a particle size from 0.1 micron to that which will pass a 30 mesh screen.

11. The sight glass according to claim 6 wherein the bore is tapered from its inner end and the lens holding sleeve is correspondingly tapered to fit said bore.

12. The sight glass according to claim 6 wherein said outwardly projecting continuous flange and said inwardly projecting lip are formed integrally with said lens holding sleeve.

13. A lens sub-assembly for use in a sight glass for a reaction vessel, said sub-assembly comprising: a lens holding sleeve having an outwardly projecting continuous flange and an inwardly projecting lip at one end thereof, a lens received within said sleeve, the thermal coefficient of expansion of said lens being different from the thermal coefficient of expansion of said lens-holding sleeve, a resilient gasket interposed between and sealing the space between the lens and the lip, and a fluid packing interposed between the periphery of said lens and the interior surface of said sleeve, said fluid packing having a coefficient of expansion compatible with the differential in thermal coefficient of expansion between said lens and said sleeve, so that changes in temperature do not adversely affect the seal between said packing and said lens in said sleeve.

14. A lens sub-assembly according to claim 13 wherein the fluid packing provides an adhesive bond between said lens and said sleeve.

15. A lens sub-assembly according to claim 13 wherein said outwardly projecting continuous flange and said inwardly projecting lip are formed integrally with said lens holding sleeve.

16. A lens sub-assembly according to claim 13 wherein said fluid packing is a filled elastomer containing from about 0.5% to about 200% by weight of the elastomer of a filler.

17. A lens sub-assembly according to claim 16 whereing said filler has a particle size from about 0.1 micron to about that which will pass a 30 mesh screen.

References Cited by the Examiner

UNITED STATES PATENTS

| | | | |
|---|---|---|---|
| 2,016,481 | 10/1935 | Brelsford et al. | 73—330 |
| 2,331,917 | 10/1943 | Kocher | 73—334 |
| 2,744,487 | 5/1956 | Moore et al. | 73—323 X |
| 2,948,555 | 8/1960 | Wright | 277—26 |
| 3,140,566 | 7/1964 | Wagner | 52—309 |
| 3,148,543 | 9/1964 | Le Roy | 73—331 |
| 3,160,675 | 12/1964 | Kastrop | 260—37 |

FOREIGN PATENTS 555,008    7/1932    Germany.

LOUIS R. PRINCE, *Primary Examiner.*

D. M. YASICH, *Assistant Examiner.*